United States Patent [19]

Stavlo

[11] Patent Number: 4,481,972

[45] Date of Patent: Nov. 13, 1984

[54] PALLET FOR PRESSURIZED GAS CYLINDERS

[75] Inventor: Lars G. Stavlo, Sigtuna, Sweden

[73] Assignee: AGA AB, Cleveland, Ohio

[21] Appl. No.: 416,118

[22] Filed: Sep. 9, 1982

[51] Int. Cl.³ .......... F16L 3/00

[52] U.S. Cl. .......... 137/376; 108/55.1; 206/446; 206/595; 410/36

[58] Field of Search .......... 137/343, 376, 602; 206/386, 443, 446, 595; 108/55.1, 55.5; 410/68, 35, 36, 42, 47, 48, 49; 294/67 R, 67 D, 67 E

[56] References Cited

U.S. PATENT DOCUMENTS

| | | | |
|---|---|---|---|
| Re. 22,507 | 6/1944 | Heigis . | |
| 2,317,064 | 4/1943 | Josephian . | |
| 2,404,513 | 7/1946 | McCabe . | |
| 2,518,569 | 8/1950 | Pierson | 137/602 |
| 2,662,649 | 12/1953 | Gill et al. . | |
| 2,989,176 | 6/1961 | Hasselhoff . | |
| 3,253,707 | 5/1966 | Gooding . | |
| 3,259,249 | 7/1966 | Arts . | |
| 3,602,368 | 8/1971 | Gould . | |
| 3,837,614 | 9/1974 | Palovits et al. . | |
| 4,061,391 | 12/1977 | Violette | 410/36 |
| 4,173,334 | 11/1979 | Lombard | 294/67 E |
| 4,295,431 | 10/1981 | Stavlo | 220/1.5 |

*Primary Examiner*—Martin P. Schwadron
*Assistant Examiner*—Sheri Novack
*Attorney, Agent, or Firm*—David A. Burge

[57] ABSTRACT

A pallet for handling and transporting a plurality of pressurized gas cylinders includes a floor structure on which the cylinders stand and side walls to retain the cylinders in place on the floor structure. For certain gas delivery applications it is desired to gang the cylinders by connecting them to a common manifold which is protectively supported on the pallet. To this end, a pair of upright center posts are provided at opposite sides of the pallet. The posts extend above the tops of the cylinders. A cross bar interconnects the upper ends of the posts and provides a structure for protectively supporting a manifold. An elongate manifold depends from and is supported by the cross bar. The manifold has ports which are connected by flexible high pressure hoses to each of the cylinders. The cross bar preferably takes the form of a truss structure which additionally cooperates with the center posts to provide a lifting frame that can be engaged by a crane for handling the pallet.

15 Claims, 3 Drawing Figures

PALLET FOR PRESSURIZED GAS CYLINDERS

CROSS-REFERENCE TO RELATED APPLICATIONS AND PATENT

DELIVERY SYSTEM FOR PRESSURIZED GAS, Ser. No. 416,238 filed Sept. 9, 1982, by Lars G. Stavlo, hereinafter referred to as the "Vehicle Case," the disclosure of which is incorporated herein by reference.

METHOD AND APPARATUS FOR TRANSPORTING PRESSURIZED GAS CYLINDERS, Ser. No. 416,237 filed Sept. 9, 1982, by Lars G. Stavlo, hereafter referred to as the "Banding Case," the disclosure of which is incorporated by reference.

PALLET FOR PRESSURIZED GAS CYLINDERS, U.S. Pat. No. 4,295,431 issued Oct. 10, 1981 to Lars G. Stavlo, hereinafter referred to as the "Pallet Patent," the disclosure of which is incorporated herein by reference.

BACKGROUND OF THE INVENTION

1. Field of the Invention

The present invention relates to an improved pallet for handling pressurized gas cylinders, for manifolding the output of a group of pallet-carried cylinders.

2. Prior Art

The referenced Pallet Patent discloses the use of a pallet for receiving, retaining and facilitating the transportation of pressurized gas cylinders. The pallet described and illustrated in the Pallet Patent is desirably characterized by simplicity of construction while providing a rigid structure which simplifies the retaining and transporting of a group of pressurized gas cylinders.

While the pallet described in the referenced Pallet Patent is well suited for its intended use, it does not fully address certain needs encountered in special applications. One such application involves the use of pressurized gas cylinders which are semi-permanently positioned in a pallet, and which are desirably all connected to a common distribution conduit. The pallet disclosed in the Pallet Patent does not readily lend itself to this specialized application in view of its lack of suitable structure for protectively supporting a manifold at a location which will serve the cylinders it carries.

While the pallet described in the Pallet Patent can be handled in a precise manner by a fork lift truck, such handling must normally be carried out carefully and slowly in view of its loaded weight and the resulting high center of gravity of the load. An alternate way of handling this pallet involves the use of a wire rope sling which can be connected to four eyelets provided on upper surfaces of the pallet's side walls. The use of a sling is undesirable inasmuch as it requires manual placement and removal of the sling, and necessitates that the load must be guided into precise position manually in view of the sling's flexible nature.

3. The Referenced Applications

The referenced Banding Case describes a manner in which pressurized gas cylinders may be secured in place in a pallet of the type which forms the present invention. The referenced Vehicle Case describes a vehicle and other features which may be utilized in conjunction with the practice of the present invention.

SUMMARY OF THE INVENTION

The present invention provides a pallet which is similar in several respects to the pallet shown and described in the referenced Pallet Patent. A pallet embodying the preferenced practice of the present invention incorporates beneficial features of the pallet described in the referenced Pallet Patent, together with a number of improvements including the use of a pair of upstanding center posts located centrally with respect to two opposite sides of the pallet. The center posts extend upwardly beyond the upper ends of such cylinders as may be carried on the pallet. A cross member rigidly connects the upper ends of the center posts. A gas distribution manifold depends from and is protectively supported by the cross member at a location between the center posts. Each of the cylinders is connected to the manifold.

In preferred practice, the upstanding center posts are secured to the floor of the pallet and to the pallet's opposite side walls in a load bearing manner. The cross member takes the form of a triangular truss or yoke which performs a plurality of functions. The yoke carries a large pin, opposed ends of which are shrouded by guide plates. The pin is engageable by the hook of a crane to enable the pallet and its load to be raised or lowered by engagement between the pallet and the hook at a single overhead point of contact. Where a crane is used which has a dirigible hook that can be controllably moved about a vertical axis, the entire operation of coupling, raising, positioning, placing, lowering and disconnecting can be handled easily and quickly by a crane operator.

BRIEF DESCRIPTION OF THE DRAWING

The foregoing and other features and advantages, and a fuller understanding of the invention, may be had by referring to the following description and claims, taken in conjunction with the accompanying drawing, wherein:

DESCRIPTION OF THE PREFERRED EMBODIMENT

Figure 1:
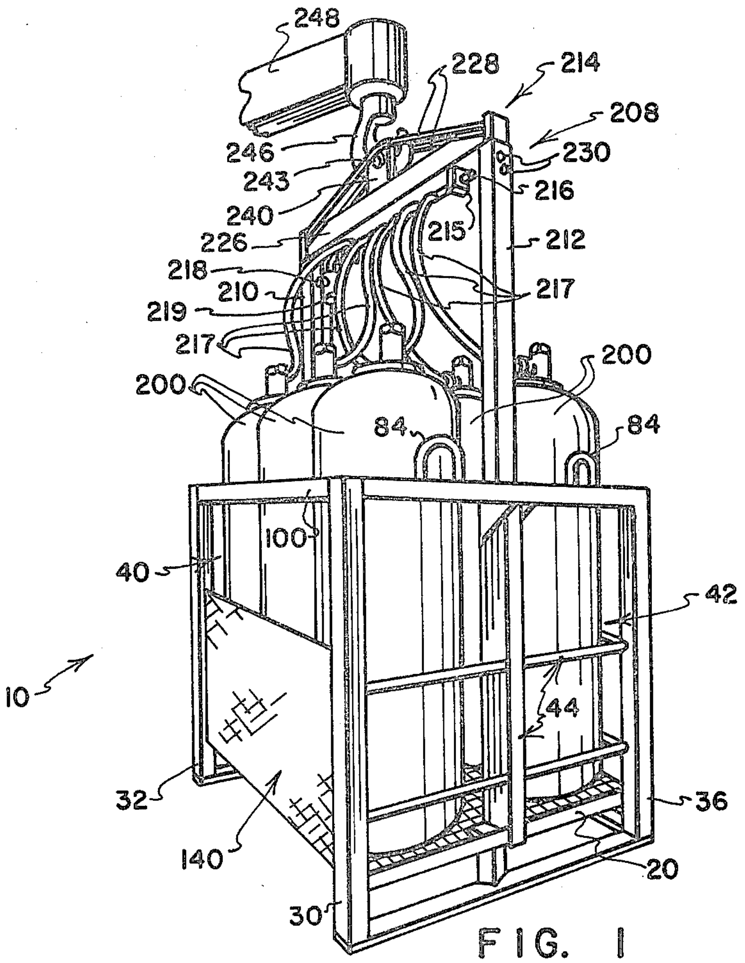
FIG. 1 is a perspective view of one form of pallet in accordance with the present invention carrying a plurality of gas cylinders.
Figure 2:
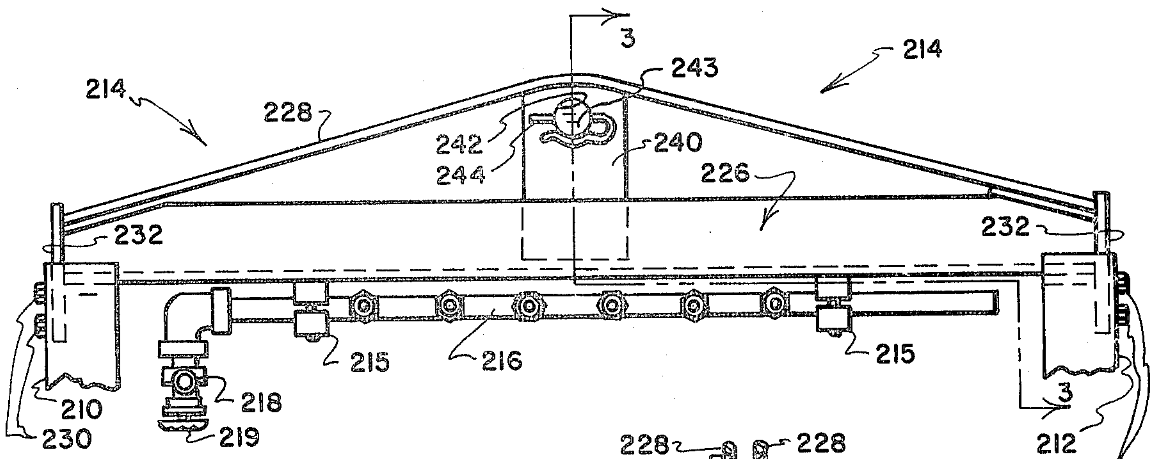
FIG. 2 is an enlarged side elevational view of an upper portion of the pallet of FIG. 1 showing details of the yoke and the mounting of a gas distribution manifold; and, FIG. 3 is a sectional view as seen from a plane indicated by a line 3—3 in FIG. 2.
Figure 3:
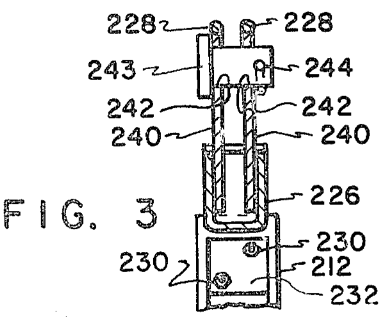

Referring to FIG. 1, a pallet embodying the preferred practice of the present invention is indicated generally by the numeral 10. The pallet 10 includes a floor structure 20, three upstanding corner posts indicated by the numerals 30, 32, 36, and a fourth corner post which is identical to the post 34 but which is hidden behind an array of cylinders 200 carried on the pallet 10.

The pallet 10 has three fixed, upstanding side walls 40, 42, 44, and movable upper and lower gate members 100, 140 which provide an openable fourth side wall. Eyelets 84 are provided on the upper surfaces of the side walls 40, 44 for engagement by a lifting sling. Only two eyelets 84 carried on the side wall 44 can be seen in FIG. 1 inasmuch as two similar eyelets carried on the opposite side wall 40 are hidden by the cylinders 200. As thus far described, the pallet 10 is of the type described in the referenced Pallet Patent.

In accordance with one feature of the present invention, the pallet 10 is provided with an upstanding center structure 208. The structure 208 is of inverted U-shaped configuration, and includes a first post 210, a second post 212, and a cross member 214 which rigidly connects the upper ends of the posts 210, 212. The post 210 is firmly affixed to a side portion of the floor structure 20 and to a central portion of the side wall 40. The post 212 is firmly affixed to an opposite side portion of the floor structure 20 and to a central portion of the opposite side wall 44. The center posts 210 and 212 project substantially above the corner posts 30, 32, 36 and the unseen fourth corner post. The upper ends of the center posts 210, 212 are well above the tops of cylinders 200 as may be carried on the pallet 10.

The cross member 214 has its opposite ends rigidly connected to the posts 210 and 212. A pair of hanger clamps 215 are secured to the under surface of the cross member 214. A gas distribution manifold 216 depends from and is supported by the clamps 215. The manifold 216 is provided with a plurality of ports, each being connectable to a separate one of the cylinders 200 by one of a plurality of high pressure hoses 217. The manifold 216 also has a discharge connector 218 at one end controlled by a valve 219.

The cross member 214 includes a triangular truss construction or yoke formed by a base bar 226 and a pair of truss rods 228, the ends of which are welded together and rigidly secured to the upper ends of the center posts 210 and 212 as by threaded fasteners 230. The base bar 226 acts as a compression member or rigid spreader serving to maintain the proper spacing between the upper ends of the posts 210, 212 preventing their inward deflection under load. A pair of depending ears 232 are attached, as by welding, one to each end of the base bar 226. The fasteners 230 extend through aligned holes formed through the ears 232 and through the posts 210, 212 to connect the cross member 214 to the posts 210, 212.

The truss rods 228 are bent midway along their lengths so that their central portions are spaced above the base bar 226. A pair of upstanding guide plates 240 have their lower ends welded to the base bar 226. Each of the guide plates 240 has its upper end welded to one of the truss rods 228. Aligned openings 242 are formed through the guide plates 240 near their upper ends. The openings 242 in the guide plates 240 are sized to receive a headed lift pin 243. The pin 243 is releasably retained in place in any suitable manner, for example by a spring detent pin 244. The lift pin 243 is designed to receive the hook 246 of a crane 248 which may be inserted into the channel formed between the guide plates 240 to engage the bottom of the lift pin 242 to raise and lower the pallet 10 and to move it about.

When a crane hook 246 engages the lift pin 243, the side faces of the hook 246 will be relatively confined by the guide plates 240. In the situation where the crane 248 is of the variety provided with a dirigible hook which can be power actuated to turn about a vertical axis, it will be seen that the side faces, of the hook 246 act against the guide plates 240 and are able to effect orientation of a suspended pallet 10 in any desired manner under the control of a crane operator.

As will be apparent from the foregoing description, a pallet embodying the preferred practice of the present invention provides a construction wherein a gas distribution manifold is protectively supported at an overhead position with respect to the cylinders carried on the pallet. In addition, the present invention provides a pallet structure which facilitates efficient handling of the pallet.

Although the invention has been described in its preferred form with a certain degree of particularity, it is understood that the present disclosure of the preferred form has been made only by way of example and that numerous changes in the details of construction may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A pallet for pressurized gas cylinders comprising:

(a) a floor structure for supporting a plurality of gas cylinders;

(b) an upstanding center structure including a pair of upstanding posts projecting upwardly from each of two opposite sides of the pallet, each of the posts being of sufficient length to extend above the tops of such gas cylinders as may be carried on the floor structure;

(c) the center structure further including a cross member which is rigidly secured to upper ends of the posts and cooperating with the posts to define an inverted U-shaped framework means for protectively supporting a gas distribution manifold at a location above the tops of such gas cylinders as may be carried on the floor structure;

(d) a gas distribution manifold depending from and carried by the cross member, the manifold including a plurality of ports; and, (e) flexible conduit means for communicating each of the ports to a separate one of such pressurized gas cylinders as may be carried on the floor structure.

2. The pallet of claim 1 wherein:

(a) the posts are firmly affixed to the floor structure at their bottom ends;

(b) the manifold support member is a structural member for preventing inward deflection of the posts under load; and, (c) there is further provided means rigidly associated with the manifold support member for making connection with a crane hook.

3. The pallet of claim 1 wherein the cross member includes a yoke extending between and affixed to the upper ends of the center posts, the yoke comprising:

(i) means for preventing deflection of the posts towards each other under load; and, (ii) means located midway of the yoke length for making engagement with a crane hook.

4. The pallet of claim 1 wherein the manifold means includes an elongate structure having said ports formed therein to receive said flexible conduit means for communicating the elongate structure with each of such pressurized gas cylinders as are carried by the pallet.

5. The pallet of claim 4 wherein the elongate structure is mounted beneath the cross member and between the upstanding posts, whereby the elongate structure is shielded by the cross member and by the posts.

6. A pallet for pressurized gas cylinders, comprising:

(a) a floor structure for supporting a plurality of gas cylinders;

(b) an upstanding center post structure affixed to the floor structure at central locations along each of two opposite sides of the floor structure, the center post structure including a pair of posts each being of a sufficient length to extend above the tops of such gas cylinders as are carried on the floor structure;

(c) a yoke extending between and affixed to the upper ends of the center posts, the yoke comprising:

(i) means for preventing deflection of the posts towards each other under load; and, (ii) means located midway of the yoke length for making engagement with a crane hook;

(d) the means for preventing deflection of the center posts including a rigid cross bar rigidly interconnecting the upper ends posts;

(e) the yoke further including yoke side members connected to opposite faces of the cross bar and extending above the cross bar;

(f) the means for making engagement with a crane hook comprising a pin extending between the yoke side members; and, (g) the yoke side members each including a rod attached at opposite ends to opposite ends of the cross bar, and a guide plate located midway of the yoke length, the guide plate being connected at its lower end to the cross bar and at its upper end to the central portion of the rod, the guide plates each having an opening near its upper end, and the pin being supported in the yoke by its projection through the guide plate openings.

7. The pallet of claim 6 additionally including overhead distribution manifold means for connection with such cylinders as are carried by the pallet, the manifold means being mounted directly beneath the yoke.

8. The pallet of claim 7 wherein the manifold means includes an elongate structure having openings formed therein to receive conduit means for connecting the elongate structure to each of such cylinders as are carried by the pallet, the manifold means being mounted beneath the yoke and extending substantially parallel thereto, whereby the manifold means is protectively shielded by the posts and by the yoke.

9. A pallet for pressurizied gas cylinders, comprising:

(a) a floor structure for supporting a plurality of gas cylinders;

(b) an upstanding center post structure affixed to the floor structure at central locations along each of two opposite sides of the floor structure, the center post structure including a pair of posts each being of a sufficient length to extend above the tops of such gas cylinders as are carried on the floor structure;

(c) a yoke extending between and affixed to the upper ends of the center posts, the yoke comprising:

(i) means for preventing deflection of the posts towards each other under load;

(ii) means located midway of the yoke length for making engagement with a crane hook;

(d) the means for preventing deflection of the center post including a rigid cross bar rigidly interconnecting the upper ends posts;

(e) an overhead distribution manifold for connection with such cylinders as are carried by the pallet; and, (f) mounting means connecting the manifold to the cross bar.

10. The pallet of claim 9 wherein the mounting means includes clamp members which connect the manifold to the lower surface of the cross bar.

11. The pallet of claim 9 additionally including flexible conduit means for communicating the manifold with such pressurized gas cylinders as may be carried on the floor structure.

12. The pallet of claim 11 wherein:

(a) the manifold has a plurality of ports; and, (b) the flexible conduit means includes a plurality of flexible conduits, with each of the conduits being connected to a separate one of the manifold ports.

13. The pallet of claim 9 wherein the manifold is connected to the cross bar and is positioned beneath the cross bar at a location between the center posts, whereby the manifold is protectively shielded by the center posts and by the cross bar.

14. The pallet of claim 9 wherein the manifold is an elongate structure having a first length, the cross bar is an elongate structure having a second length that is greater than the first length, and the manifold is positioned beneath the cross bar and between the center posts, whereby the manifold is protectively shielded by the center posts and by the cross bar.

15. The pallet of claim 9 wherein the manifold includes an elongate structure having opposed ends, and having connector means including a valve at one of its ends, and the manifold is positioned between the center posts and is supported to depend from the cross bar, whereby the center posts and the cross bar protectively shield the manifold.

* * * * *